US012793003B2

(12) United States Patent
Dede et al.

(10) Patent No.: US 12,793,003 B2
(45) Date of Patent: Nov. 10, 2026

(54) SYSTEM AND METHOD FOR SIMULATING LOAD SHIFTING DURING TRANSIT

(71) Applicant: Torc Robotics, Inc., Blacksburg, VA (US)

(72) Inventors: Xholjon Dede, Esslingen am Neckar (DE); Sebastian Dingler, Stuttgart (DE); Paul Birth, Esslingen (DE); Gerardas Skeberdis, Hickory Hills, IL (US); Matthew Swanson, Blacksburg, VA (US); Adam Schneider, Christiansburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 52 days.

(21) Appl. No.: 18/890,497

(22) Filed: Sep. 19, 2024

(65) Prior Publication Data

US 2026/0080350 A1 Mar. 19, 2026

(51) Int. Cl.
*G06Q 10/0832* (2023.01)
*G06K 7/14* (2006.01)

(52) U.S. Cl.
CPC ....... *G06Q 10/0832* (2013.01); *G06K 7/1417* (2013.01)

(58) Field of Classification Search
CPC ............................... G06Q 50/60; G06Q 50/40
See application file for complete search history.

(56) References Cited

U.S. PATENT DOCUMENTS 10,311,315 B2 6/2019 Drazan et al.
10,330,483 B2 6/2019 Anderson et al.
11,580,484 B2 2/2023 Patnaik et al.
2019/0126918 A1* 5/2019 Takayanagi ....... B60W 50/0097
2021/0049539 A1* 2/2021 Agrawal ............... G01M 1/122
2021/0090005 A1* 3/2021 Dholakia ............... G06V 20/59

OTHER PUBLICATIONS

Jagelčák et al., Determination of Turning Radius and Lateral Acceleration of Vehicle by GNSS/INS Sensor. Sensors (Basel). Mar. 16, 2022;22(6):2298. doi: 10.3390/s22062298. PMID: 35336468; PMCID: PMC8950859. (Year: 2022).*

* cited by examiner

*Primary Examiner* — Bryan J Kirk
(74) *Attorney, Agent, or Firm* — McCarter & English, LLP

(57) ABSTRACT

A system includes at least one memory and at least one processor coupled to the at least one memory. The at least one processor is configured to: (i) based upon sensor data, identify a respective location of each package of a plurality of packages loaded in a cargo area of a trailer; (ii) receive dimensions and weight data corresponding to each package of the plurality of packages; (iii) determine a center of mass of the cargo area loaded with the plurality of packages; (iv) determine a type of load concentration based upon the respective location and the weight data of each package; and (v) based at least in part upon the type of load concentration, based at least in part upon route information, and based at least in part upon the center of mass, generate a probability score of an undesired incident during transport of the plurality of packages.

19 Claims, 5 Drawing Sheets

100

SYSTEM AND METHOD FOR SIMULATING LOAD SHIFTING DURING TRANSIT

TECHNICAL FIELD

The field of the disclosure relates generally to safe operations of a truck-trailer loaded with a cargo, more specifically, simulating load shifting during transit along a specific route.

BACKGROUND OF THE INVENTION

Autonomous vehicles employ fundamental technologies such as, perception, localization, behaviors and planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Localization technologies may rely on inertial navigation system (INS) data. Behaviors and planning technologies determine how to move through the sensed environment to reach a planned destination. Behaviors and planning technologies process data representing the sensed environment and localization or mapping data to plan maneuvers and routes to reach the planned destination for execution by a controller or a control module. Controller technologies use control theory to determine how to translate desired behaviors and trajectories into actions undertaken by the vehicle through its dynamic mechanical components. This includes steering, braking and acceleration.

One aspect of behaviors and planning technologies is safe operation of the autonomous vehicle. An autonomous truck with a trailer loaded with cargo for transporting from one location to another location may be loaded improperly or may experience load shifting resulting in an unbalanced loading of the cargo. The unbalanced loading of cargo can potentially cause dynamics and kinematics behavior along the road that may result in vehicular accidents and cargo loss.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, a system including at least one memory configured to store instructions and at least one processor coupled to the at least one memory is disclosed. The at least one processor is configured to execute the instructions to perform operations including: (i) based upon sensor data of a plurality of sensors, identifying a respective location of each package of a plurality of packages loaded in a cargo area of a trailer, wherein the trailer is attached to a truck; (ii) receiving dimensions and weight data corresponding to each package of the plurality of packages; (iii) determining a center of mass of the cargo area loaded with the plurality of packages; (iv) determining a type of load concentration based upon the respective location and the weight data of each package of the plurality of packages; and (v) based at least in part upon the type of load concentration, based at least in part upon route information, and based at least in part upon the center of mass, generating a probability score of an undesired incident during transport of the plurality of packages from a starting location to a destination location.

In another aspect, a computer-implemented method is disclosed. The computer-implemented method includes: (i) based upon sensor data of a plurality of sensors, identifying a respective location of each package of a plurality of packages loaded in a cargo area of a trailer, wherein the trailer is attached to a truck; (ii) receiving dimensions and weight data corresponding to each package of the plurality of packages; (iii) determining a center of mass of the cargo area loaded with the plurality of packages; (iv) determining a type of load concentration based upon the respective location and the weight data of each package of the plurality of packages; and (v) based at least in part upon the type of load concentration, based at least in part upon route information, and based at least in part upon the center of mass, generating a probability score of an undesired incident during transport of the plurality of packages from a starting location to a destination location.

In yet another aspect, an application server is disclosed. The application server includes at least one memory configured to store instructions and at least one processor coupled to the at least one memory. The at least one processor is configured to execute the instructions to perform operations including: (i) based upon sensor data of a plurality of sensors, identifying a respective location of each package of a plurality of packages loaded in a cargo area of a trailer, wherein the trailer is attached to a truck; (ii) receiving dimensions and weight data corresponding to each package of the plurality of packages; (iii) determining a center of mass of the cargo area loaded with the plurality of packages; (iv) determining a type of load concentration based upon the respective location and the weight data of each package of the plurality of packages; and (v) based at least in part upon the type of load concentration, based at least in part upon route information, and based at least in part upon the center of mass, generating a probability score of an undesired incident during transport of the plurality of packages from a starting location to a destination location.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
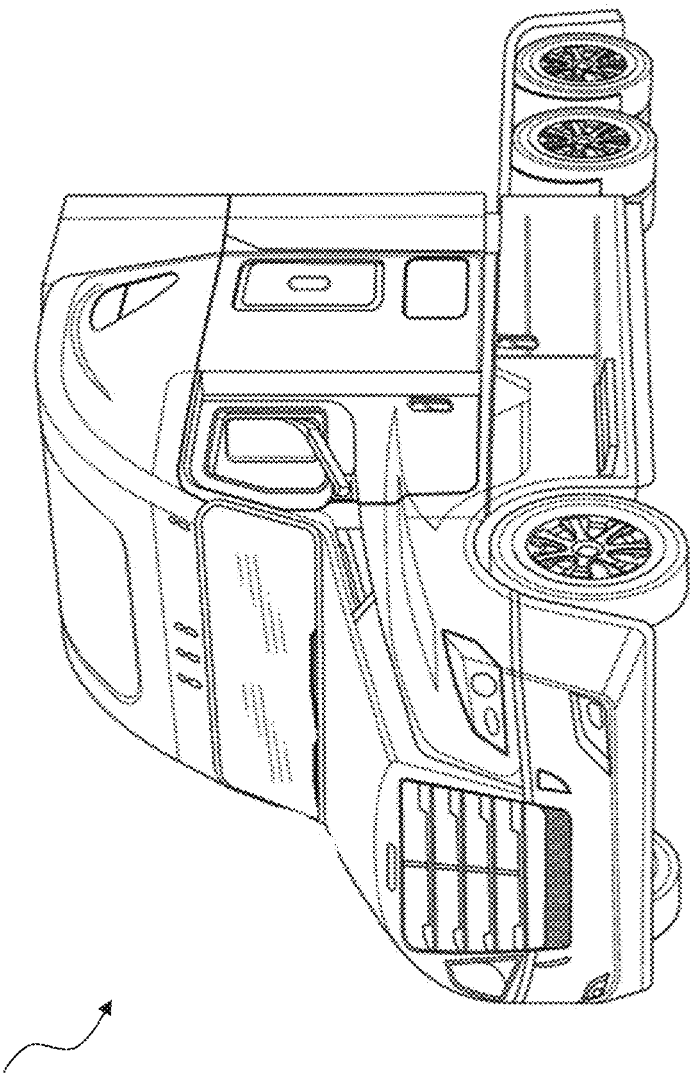
FIG. 1. is a schematic view of an autonomous truck.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

Some structural or method features may be shown in specific arrangements and/or orderings in the drawings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments, and, in some embodiments, it may not be included or may be combined with other features.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

One or more of the following terms may be used in the disclosure, and their definition is provided below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

Mission control: Mission control, as described in the present disclosure, refers to one or more application servers, and one or more database servers communicatively coupled with each other and one or more autonomous vehicles of a fleet. Mission control receives sensor data collected by one or more sensors of the one or more autonomous vehicles of the fleet and transmit data, e.g., threat assessment scores and/or driving histories of one or more vehicles on the road, to the one or more autonomous vehicles of the fleet.

As described herein, the trucking industry is widely used to transport cargo across the country. During the transport, an unbalanced loading of the cargo can occur, for example, due to improper loading or load shifting, which may result in a trailer having dynamics and kinematics behavior along the road that can potentially result in a vehicular accident or cargo loss. Embodiments described in the present disclosure analyze the trailer via simulation for a road to be driven from a starting location to a destination location to enable proper loading of cargo and to prevent cargo loss or vehicular accidents that may result from unbalanced loading of the cargo.

In some embodiments, a simulation model is used to calculate a probability score of a cargo shift. Usually, every package being loaded in the trailer has a machine-readable code label applied to the package. The machine-readable code may be a bar code or a quick-response (QR) code, and may provide details about the package including dimensions or a cargo class of the package, and weight of the package. The machine-readable code may also provide details of a sender or details of a receiver. The machine-readable code of each package is scanned prior to each package being loaded in the trailer, and the scanned data corresponding to the machine-readable code is uploaded to a database or a database server at mission control.

In some embodiments, one or more camera sensors may be installed in the trailer such that image data for an entire cargo area of the trailer may be collected. Additionally, or alternatively, one or more light detection and ranging (LiDAR) sensors may be installed in the trailer such that point cloud (PC) data for the entire cargo area of the trailer may be collected. The image data or PC data may be analyzed to identify a position and an arrangement of each package loaded in the cargo area of the trailer. The image data or PC data is transmitted to an application server at mission control.

In some embodiments, a loading bay may be equipped with one or more camera sensors or one or more LiDAR sensors to collect image data or PC data, respectively, as the trailer is loaded with packages. The image data or PC data may be analyzed to identify a position and an arrangement of each package loaded in the cargo area of the trailer. The image data or PC data is transmitted to an application server at mission control.

In some embodiments, while the packages are being loaded in the trailer, the machine-readable code on each package may be captured in the image data. Based upon the machine-readable code captured in image data corresponding to one or more images, weight and dimensions of packages corresponding to their location and arrangement in the cargo area of the trailer may be identified. Based upon the image data, or PC data, a three-dimensional (3D) model corresponding to the positioning of the cargo in the trailer is constructed. By way of a non-limiting example, the 3D model may be constructed using the image data from the one or more camera sensors using open-source tools such as, openMVG and openMVS. Additionally, or alternatively, the 3D model may be constructed from the PC data collected using the one or more LiDAR sensors.

Further, the scanned machine-readable code information of various packages may be used to identify weights in different sections of the cargo area of the trailer. Based upon the identified weights in different sections of the cargo area of the trailer, a center of mass and information about the load concentration may be computed or calculated. For the trailer loaded with a set of $i=1, \ldots, N$ number of packages, the overall center of mass can be calculated using an approximation along each of the X-axis, Y-axis, and Z-axis using Eq. 1, Eq. 2, and Eq. 3, respectively, as shown below.

$$C_x = \frac{\sum_{i=1}^{N} m_i \cdot x_i}{\sum_{i=1}^{N} m_i} \quad \text{Eq. 1}$$

$$C_y = \frac{\sum_{i=1}^{N} m_i \cdot y_i}{\sum_{i=1}^{N} m_i} \quad \text{Eq. 2}$$

$$C_z = \frac{\sum_{i=1}^{N} m_i \cdot z_i}{\sum_{i=1}^{N} m_i} \quad \text{Eq. 3}$$

A center of mass may be then computed as $[C_x, C_y, C_z]$. Further, based upon identifying how weights are arranged in different sections of the cargo area of the trailer, a type of load concentration may be determined or classified as an unbalanced, a lateral, or a longitudinal load concentration. The unbalanced load concentration occurs when there is disproportionate weight of the cargo at one longitudinal end of the trailer in comparison to another longitudinal end of the trailer, i.e., front versus back. The lateral load concentration occurs when there is disproportionate weight of the cargo at one latitudinal side of the trailer in comparison to another latitudinal side of the trailer, i.e., right versus left. The lateral load concentration may be measured or identified using axle load sensors. The longitudinal load concentration occurs when the cargo is loaded, with the same or different amount weight, at both longitudinal ends of the trailer with an empty space or no cargo being loaded or placed in the middle or some sections of the trailer.

The unbalanced load concentration of the trailer generally causes uneven braking or uneven torque characteristics when the truck-trailer is driving uphill or downhill. The lateral load concentration of the trailer generally causes dog legging or driving the truck-trailer in a "zig-zag" manner. Additionally, or alternatively, the lateral load concentration also increases a probability of unintended lane departure for the truck-trailer. The longitudinal load concentration increases a likelihood of the cargo being shifted during transport, which can occur even if the cargo is balanced within the trailer. A very uneven load distribution with significant weight difference is generally accompanied by a change on the roll angle of the trailer, or cause oscillations or change in trailer dynamics.

Based upon the load concentration of the trailer, route information, and the center of mass, which is computed as described herein, a route simulation model may be generated. Route information may include one or more of: speed limits, road curves, a number of traffic lanes, one or more traffic patterns during different times, and road maintenance details, along the road from the starting location to the destination location. The route simulation model may include a probability score of one or more of an accident, damage to the cargo, or loss of cargo along the road from the starting location to the destination location. By way of a non-limiting example, the probability score may be computed or calculated by the route simulation model based upon the load concentration of the trailer, the center of mass, and the route information using historic data of accidents or other undesired incidence occurred along the route and corresponding cargo conditions (including total weight of the cargo, weight distribution of the cargo inside the trailer, speed of the trailer, road conditions including shape or curve of the road, etc.).

Upon determining that the probability score of one or more of an accident, damage to the cargo, or loss of cargo satisfying a user-specified criteria, for example, the probability score of one or more of an accident, damage to the cargo, or loss of cargo being at or lower than a user-specified threshold value, generating and transmitting a list of preemptive parameters' values so that the truck-trailer and the cargo are safe from incidents caused by improper loading of the cargo in the trailer. The list of preemptive parameters' values may be transmitted to mission control or the truck. Mission control may forward the list of preemptive parameters' values to the truck. The truck may use the list of preemptive parameters' values for determining behavior and control actions including, not exceeding above a certain speed along the road or along specific sections of the road or driving within a set of specific values for the acceleration, braking, and speed. As described herein, the list of preemptive parameters may include, but not limited to, acceleration, braking, speed, maximum speed, or deceleration.

Alternatively, upon determining that the probability score of one or more of an accident, damage to the cargo, or loss of cargo being at or greater than the user-specified threshold value, an alternate route may be determined to transport the cargo from the starting location to the destination location. If the alternate route is available, details of the alternate route is reported to mission control for updating details of the cargo transporting. If no alternate route is available, alternate loading suggestions may be generated or mission control may be recommended to stop the mission.

In the case that the mission is approved to proceed, during transportation of the cargo along the road, the cargo may be monitored using one or more LiDAR sensors, or one or more camera sensors, or both, for shifting of cargo within the trailer, and comparing with the generated route simulation model. Sensor data corresponding to the cargo, and current location and position data of the truck-trailer, as collected during transportation, may be used to compare the list of preemptive parameters' values based upon the route simulation model with the real time actual values of the preemptive parameters, and to improve or train the machine learning algorithms to generate the route simulation model.

FIG. 1 illustrates a vehicle 100, such as a truck that may be conventionally connected to a single or tandem trailer to transport the trailer (not shown in FIG. 1) to a desired location. The vehicle 100 includes a cabin that can be supported by, and steered in the required direction, by front wheels and rear wheels that are partially shown in FIG. 1. Front wheels are positioned by a steering system that includes a steering wheel and a steering column (not shown in FIG. 1). The steering wheel and the steering column may be located in the interior of cabin.

The vehicle 100 may be an autonomous vehicle, in which case the vehicle 100 may omit the steering wheel and the steering column to steer the vehicle 100. Rather, the vehicle 100 may be operated by an autonomy computing system (not shown in FIG. 1) of the vehicle 100 based on data collected by a sensor network (not shown in FIG. 1) including one or more sensors.

Figure 2:
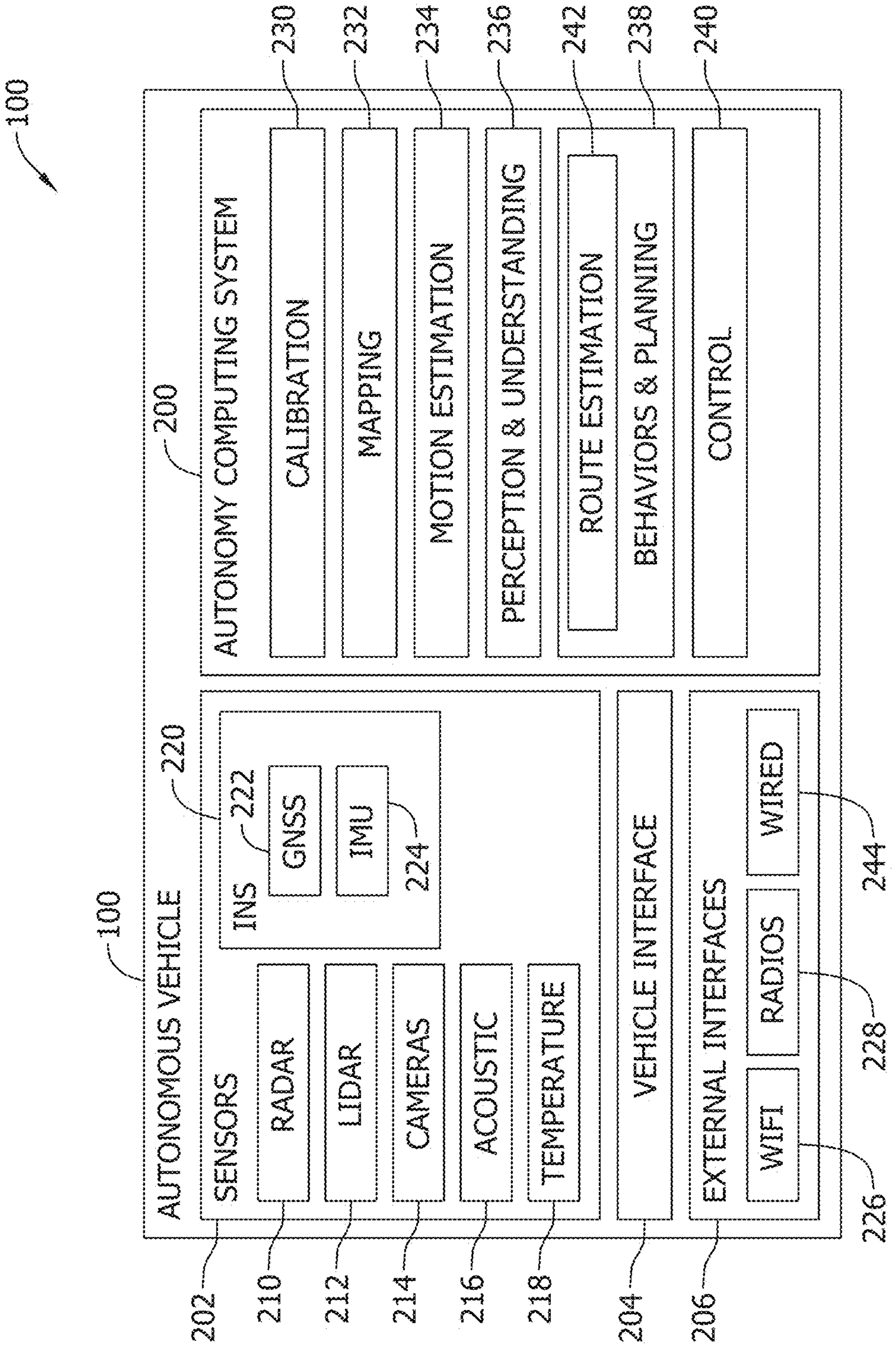
FIG. 2 is a block diagram of the autonomous truck shown in FIG. 1.

FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operations of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed to identify one or more construction markers or other objects in the environment surrounding autonomous vehicle 100. In some embodiments, the image data generated by cameras 214 may be sent to autonomy computing system 200 or other aspects of autonomous vehicle 100 or mission control (a hub) or both.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination to identify one or more construction markers (or nodes) around autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5G, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connections while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and a route simulation module 242. The route simulation module 242, for example, may be embodied within another module, such as behaviors and planning module 238, perception and understanding module 236, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

The route simulation module 242 generates a route simulation model and computes a probability score of one or more of an accident, damage to the cargo, or loss of cargo, along the road from the starting location to the destination location, based upon the load concentration of the trailer, route information, and the center of mass, which is computed as described herein. Route information may include one or more of: speed limits, road curves, a number of traffic lanes, one or more traffic patterns during different times, and road maintenance details, along the road from the starting location to the destination location. The route information may also include data of weather forecast along the road.

Figure 3:
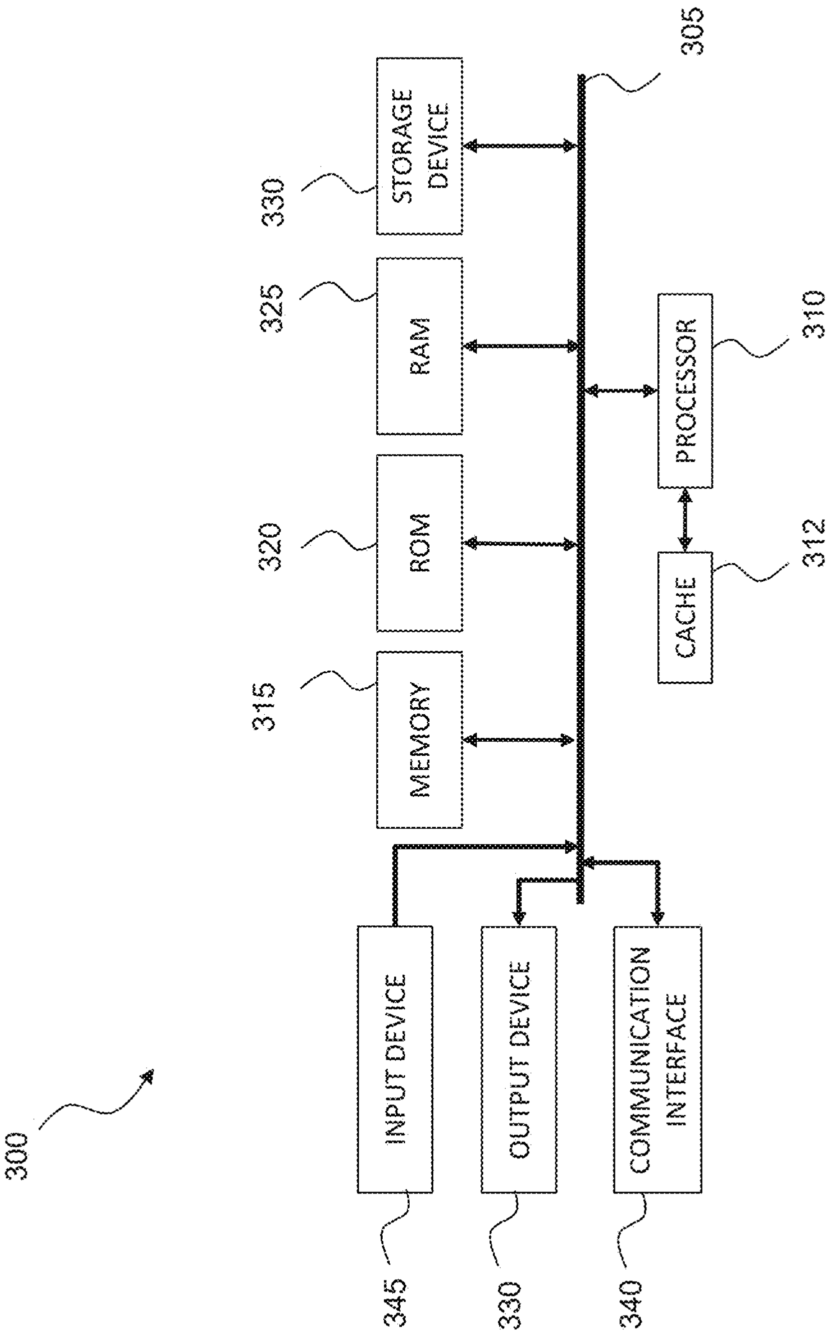
FIG. 3 is a block diagram of an example computing system.

FIG. 3 illustrates an example computing system 300 that can implement various techniques, processes, functions, or methods described herein. The components of computing system 300 are shown in electrical communication with each other using a connection 305, such as a bus. The example computing system 300 includes a processing unit (CPU or processor) 310 and a computing device connection 305 that couples various computing device components, including computing device memory 315, such as a read only memory (ROM) 320 and a random-access memory (RAM) 325, to processor 310.

Computing system 300 can include a cache 312 of high-speed memory connected directly with, in close proximity to, or integrated as part of processor 310. Computing system 300 can copy data from memory 315 and/or storage device 330 to cache 312 for quick access by processor 310. In this way, cache 312 can provide a performance boost that avoids processor 310 delays while waiting for data. These and other modules can control or be configured to control processor 310 to perform various actions. Other computing device memory 315 may be available for use as well. Memory 315 can include multiple different types of memory with different performance characteristics. Processor 310 can include any general-purpose processor, central processing unit (CPU), or graphics processing unit (GPU) in combination with a hardware or software provision configured to control processor 310 and stored in storage device 330, as well as any special-purpose processor where software instructions are incorporated into the processor design. Processor 310 may be a self-contained system, containing multiple cores or processors, a bus, memory controller, cache, etc. A multi-core processor may be symmetric or asymmetric.

Storage device 330 is a non-volatile memory and can be one or more of a hard disk or other types of computer readable media that can store data that are accessible by a computer, such as a magnetic cassette, flash memory card, solid state memory device, digital versatile disk, cartridge, RAM 325, ROM 320, or hybrids thereof. Memory 315 or storage device 330 can include software, code, firmware, etc., for controlling processor 310. Other hardware or software modules are contemplated. Memory 315 and storage device 330 are connected to computing device connection 305. In one aspect, a hardware module that performs a particular function can include the software component stored in a computer-readable medium in connection with the necessary hardware components, such as processor 310, computing device connection 305, and so forth, to carry out the function. In the example embodiment, processor 310 may be programmed by encoding an operation or function using one or more executable instructions and providing the executable instructions in memory 315 or storage device 330.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Figure 4C:
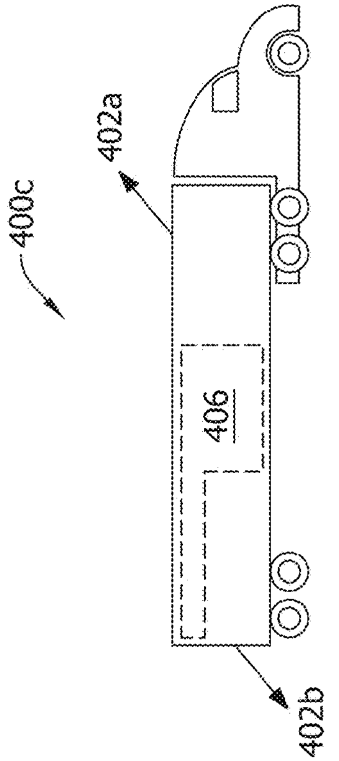
FIG. 4C is an example illustration of a longitudinal load concentration.
Figure 4B:
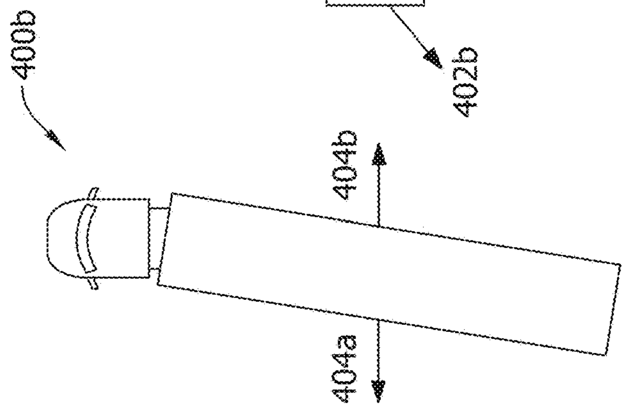
FIG. 4B is an example illustration of a lateral load concentration.
Figure 4A:
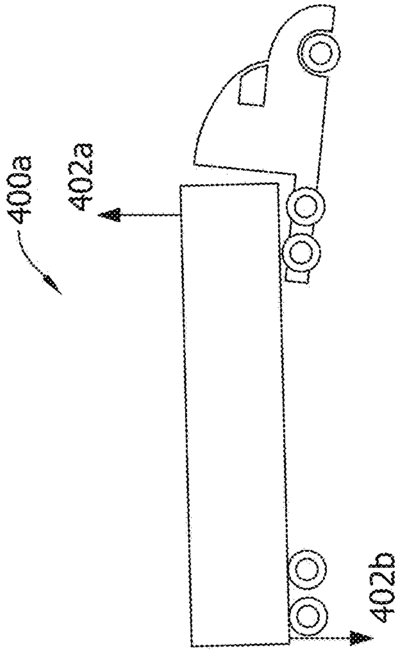
FIG. 4A is an example illustration of an unbalanced load concentration.

FIG. 4A is an example illustration 400*a* of an unbalanced load concentration. As described herein, the unbalanced load concentration occurs when there is disproportionate weight of the cargo at one longitudinal end 402*a* of the trailer in comparison to another longitudinal end 402*b* of the trailer. FIG. 4B is an example illustration 400*b* of a lateral load concentration. As described herein, the lateral load concentration occurs when there is disproportionate weight of the cargo at one latitudinal side 404*a* of the trailer in comparison to another latitudinal side 404*b* of the trailer. FIG. 4C is an example illustration 400*c* of a longitudinal load concentration. The longitudinal load concentration occurs when the cargo is loaded, with the same or different amount weight, at both 402*a* and 402*b* longitudinal ends of the trailer with an empty space or no cargo being loaded or placed in the middle or some sections of the trailer, which is shown in FIG. 4C as 406. As described herein, the type of load concentration is identified based upon how weights are arranged in different sections of the cargo area of the trailer.

Figure 5:
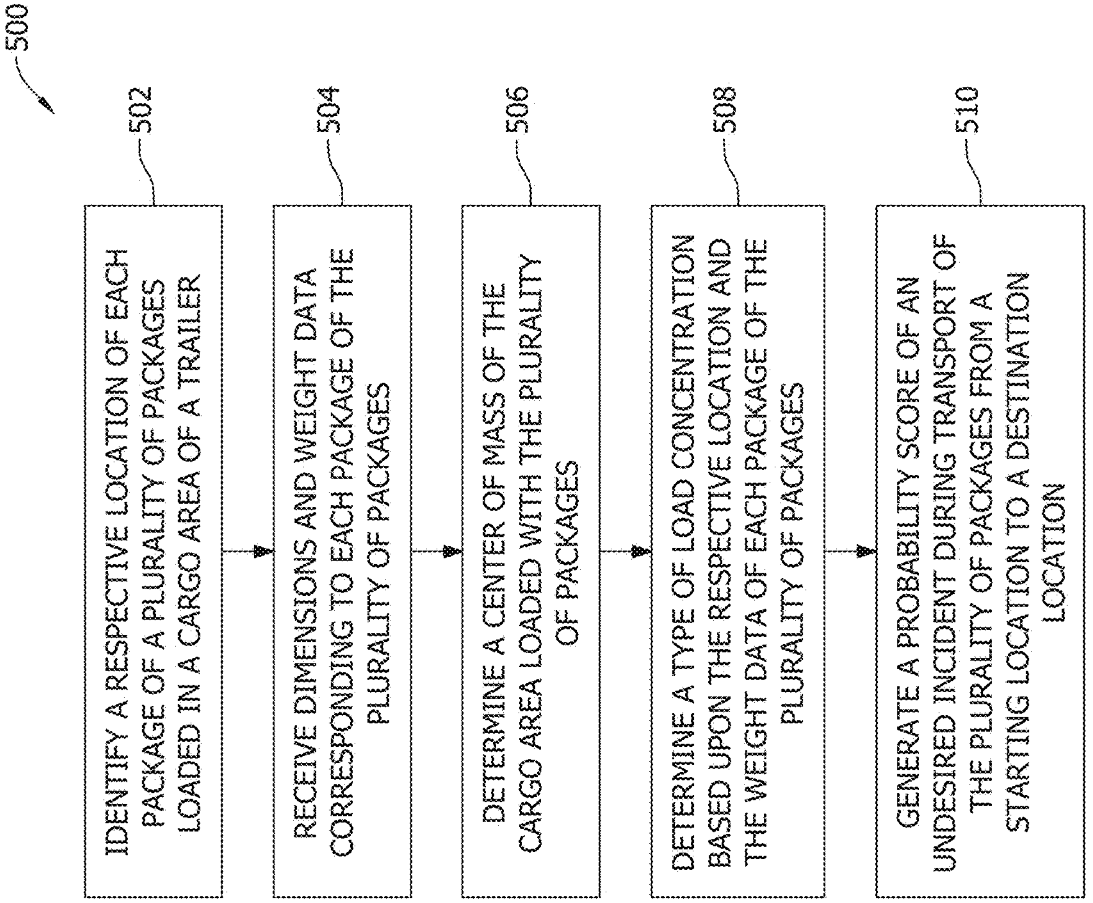
FIG. 5 is an example flow-chart of method operations of simulation of load shifting during transit along a specific route.

FIG. 5 is an example flow-chart 500 of method operations of simulation of load shifting during transit along a specific route. The method operations may be performed by an application server at mission control. Alternatively, or additionally, the method operation may be performed by autonomy computing system 200, as described herein. The method operations include, based upon sensor data of a plurality of sensors, identifying 502 a respective location of each package of a plurality of packages loaded in a cargo area of a trailer. The trailer is attached to a truck for transporting the plurality of packages from a starting location to a destination location. The plurality of sensors includes one or more of: at least one camera sensor, or at least one LiDAR sensor. The plurality of sensors may be positioned inside the trailer or in a docking area of mission control. Accordingly, when the plurality of packages is being loaded in the cargo area, sensor data of the plurality of sensors, for example, image data, or LiDAR PC data may be used to identify a respective location of each package of the plurality of packages inside the cargo area of the trailer.

The method operations include receiving 504 dimensions and weight data corresponding to each package of the plurality of packages. By way of a non-limiting example, the dimensions and the weight data corresponding to each package of the plurality of packages are received based upon scanning a machine-readable code applied on each package of the plurality of packages. The machine-readable code is scanned using one or more camera sensors of the plurality of sensors. Additionally, or alternatively, the machine-readable code is scanned using an apparatus (e.g., a bar code reader or a QR code reader) before or while each package of the plurality of packages is being loaded in the cargo area of the trailer.

The method operations include determining 506 a center of mass of the cargo area loaded with the plurality of packages and determining 508 a type of load concentration based upon the respective and the weight data of each package of the plurality of packages. Because determining 506 the center of mass of the cargo area and determining 508 the type of load concentration are described in detail, those details are not repeated for the sake brevity.

The method operations include, based at least in part upon the type of load concentration, based at least in part upon route information, and based at least in part upon the center of mass, generating 510 a probability score of an undesired incident during transport of the plurality of packages from the starting location to the destination location. The undesired incident herein refers to one or more of vehicular accidents, cargo damage, or cargo loss. Upon determining that the probability score of the undesired incident is at or greater than a threshold value, an alternate route for transport of the plurality of packages from the starting location to the destination location may be determined. And the probability score of the undesired incident during transport of the plurality of packages from the starting location to the destination location along the alternate route may be regenerated. In other words, a probability score may be regenerated or generated based upon the type of load concentration and center of mass and based upon route information of the alternate route. By way of a non-limiting example, there may be multiple alternate routes, and the probability score may be regenerated for each alternate route. Upon determining that a regenerated probability score is at or below the threshold value for an alternate route, the alternate route for transporting the plurality of packages from the starting location to the destination location may be recommended or selected. However, if it is determined that the regenerated probability score is at or greater than the threshold value, a recommendation may be made to stop a mission of transporting the plurality of packages from the starting location to the destination location.

An example technical effect of the methods, systems, and apparatus described herein includes at least improving safety of an autonomous vehicle as the autonomous vehicle can plan to operate in a manner that increases distance from the vehicle identified as being driven by a driver having a threat assessment score at or above a specific threshold value.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a program, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random-access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to “one embodiment” of the disclosure or an “exemplary” or “example” embodiment are not intended to be interpreted as excluding the existence of additional embodiments that also incorporate the recited features. Likewise, limitations associated with “one embodiment” or “an embodiment” should not be interpreted as limiting to all embodiments unless explicitly recited.

Disjunctive language such as the phrase “at least one of X, Y, or Z,” unless specifically stated otherwise, is generally intended, within the context presented, to disclose that an item, term, etc. may be either X, Y, or Z, or any combination thereof (e.g., X, Y, and/or Z). Likewise, conjunctive language such as the phrase “at least one of X, Y, and Z,” unless specifically stated otherwise, is generally intended, within the context presented, to disclose at least one of X, at least one of Y, and at least one of Z.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, including the implementation or utilization of components of the systems or steps independently and separately from other described components or steps. Therefore, it is manifestly intended that embodiments described herein be limited only by the claims.

What is claimed is:

1. A system, comprising:

at least one memory configured to store instructions; and at least one processor coupled to the at least one memory and configured to execute the instructions to perform operations comprising:

analyzing sensor data of a plurality of sensors to identify a respective location of each package of a plurality of packages loaded in a cargo area of a trailer transporting the plurality of packages along a route from a starting location to a destination location, wherein the trailer is attached to a truck;

receiving dimensions and weight data corresponding to each package of the plurality of packages;

determining a center of mass of the cargo area loaded with the plurality of packages based upon the dimensions and weight data corresponding to each package of the plurality of packages;

determining a type of load concentration based upon the respective location and the weight data of each package of the plurality of packages;

generating a probability based at least in part upon the type of load concentration, route information, and the center of mass, wherein the probability corresponds to an undesired shift of one or more of the plurality of packages within the cargo area of the trailer during transport of the plurality of packages in the trailer, the undesired shift capable of resulting in an undesired incident during transport of the plurality of packages;

generating one or more preemptive parameters to avoid the undesired shift of the one or more of the plurality of packages and the undesired incident; and controlling one or more actions of the truck based on the one or more preemptive parameters.

2. The system of claim 1, wherein the operations further comprising:

upon determining that the probability of the undesired shift of the one or more of the plurality of packages within the cargo area of the trailer is at or greater than a threshold value, determining an alternate route for transport of the plurality of packages from the starting location to the destination location; and regenerating the probability of the undesired shift of the one or more of the plurality of packages within the cargo area of the trailer during transport of the plurality of packages from the starting location to the destination location along the alternate route.

3. The system of claim 2, wherein the operations further comprising recommending the alternate route for transporting the plurality of packages from the starting location to the destination location upon determining that a regenerated probability is below the threshold value.

4. The system of claim 2, wherein the operations further comprising recommending to stop a mission of transporting the plurality of packages from the starting location to the destination location upon determining that a regenerated probability is at or greater than the threshold value.

5. The system of claim 1, wherein the one or more preemptive parameters includes at least one of speed, acceleration, deceleration, or braking.

6. The system of claim 1, wherein the dimensions and the weight data corresponding to each package of the plurality of packages are received based upon scanning a machine-readable code applied on each package of the plurality of packages.

7. The system of claim 6, wherein the machine-readable code is scanned using one or more camera sensors of the plurality of sensors.

8. The system of claim 1, wherein the plurality of sensors includes one or more of: at least one camera sensor, or at least one light detection and ranging sensor.

9. The system of claim 1, wherein the operations further comprise generating suggestions for an alternate loading of the plurality of packages in the cargo to avoid the undesired shift of the one or more of the plurality of packages within the cargo area of the trailer during transport of the plurality of packages in the trailer along the route during control of the one or more actions of the truck based on the one or more preemptive parameters.

10. A computer-implemented method, comprising:

analyzing sensor data of a plurality of sensors to identify a respective location of each package of a plurality of packages loaded in a cargo area of a trailer transporting the plurality of packages along a route from a starting location to a destination location, wherein the trailer is attached to a truck;

receiving dimensions and weight data corresponding to each package of the plurality of packages;

determining a center of mass of the cargo area loaded with the plurality of packages based upon the dimensions and weight data corresponding to each package of the plurality of packages;

determining a type of load concentration based upon the respective location and the weight data of each package of the plurality of packages;

generating a probability based at least in part upon the type of load concentration, route information, and the center of mass, wherein the probability corresponds to an undesired shift of one or more of the plurality of packages within the cargo area of the trailer during transport of the plurality of packages in the trailer, the undesired shift capable of resulting in an undesired incident during transport of the plurality of packages;

generating one or more preemptive parameters to avoid the undesired shift of the one or more of the plurality of packages and the undesired incident; and controlling one or more actions of the truck based on the one or more preemptive parameters.

11. The computer-implemented method of claim 10, further comprising:

upon determining that the probability of the undesired shift of the one or more of the plurality of packages within the cargo area of the trailer is at or greater than a threshold value, determining an alternate route for transport of the plurality of packages from the starting location to the destination location; and regenerating the probability of the undesired shift of the one or more of the plurality of packages within the cargo area of the trailer during transport of the plurality of packages from the starting location to the destination location along the alternate route.

12. The computer-implemented method of claim 11 further comprising recommending the alternate route for transporting the plurality of packages from the starting location to the destination location upon determining that a regenerated probability is below the threshold value.

13. The computer-implemented method of claim 11 further comprising recommending to stop a mission of transporting the plurality of packages from the starting location to the destination location upon determining that a regenerated probability is at or greater than the threshold value.

14. The computer-implemented method of claim 10, wherein the dimensions and the weight data corresponding to each package of the plurality of packages are received based upon scanning a machine-readable code applied on each package of the plurality of packages.

15. The computer-implemented method of claim 14, wherein the machine-readable code is scanned using one or more camera sensors of the plurality of sensors.

16. The computer-implemented method of claim 10, wherein the plurality of sensors includes one or more of: at least one camera sensor, or at least one light detection and ranging sensor.

17. An application server, comprising:

at least one memory configured to store instructions; and at least one processor coupled to the at least one memory and configured to execute the instructions to perform operations comprising:

analyzing sensor data of a plurality of sensors to identify a respective location of each package of a plurality of packages loaded in a cargo area of a trailer transporting the plurality of packages along a route from a starting location to a destination location, wherein the trailer is attached to a truck;

receiving dimensions and weight data corresponding to each package of the plurality of packages;

determining a center of mass of the cargo area loaded with the plurality of packages based upon the dimensions and weight data corresponding to each package of the plurality of packages;

determining a type of load concentration based upon the respective location and the weight data of each package of the plurality of packages;

generating a probability based at least in part upon the type of load concentration, route information, and the center of mass, wherein the probability corresponds to of an undesired shift of one or more of the plurality of packages within the cargo area of the trailer during transport of the plurality of packages in the trailer, the undesired shift capable of resulting in an undesired incident during transport of the plurality of packages;

generating one or more preemptive parameters to avoid the undesired shift of the one or more of the plurality of packages and the undesired incident; and controlling one or more actions of the truck based on the one or more preemptive parameters.

18. The application server of claim 17, wherein the operations further comprising:

upon determining that the probability of the undesired shift of the one or more of the plurality of packages within the cargo area of the trailer is at or greater than a threshold value, determining an alternate route for transport of the plurality of packages from the starting location to the destination location; and regenerating the probability of the undesired shift of the one or more of the plurality of packages within the cargo area of the trailer during transport of the plurality of packages from the starting location to the destination location along the alternate route.

19. The application server of claim 18, wherein the operations further comprising:

recommending the alternate route for transporting the plurality of packages from the starting location to the destination location upon determining that a regenerated probability is below the threshold value; or recommending to stop a mission of transporting the plurality of packages from the starting location to the destination location upon determining that a regenerated probability is at or greater than the threshold value.

* * * * *